(12) United States Patent
Biernath et al.

(10) Patent No.: US 8,919,969 B2
(45) Date of Patent: Dec. 30, 2014

(54) ON-PRODUCT PROJECTION FOR DIGITAL MERCHANDIZING

(71) Applicant: 3M Innovative Properties Company, St. Paul, MN (US)

(72) Inventors: Rolf W. Biernath, Wyoming, MN (US); Matthew C. Robbins, Woodbury, MN (US); Ellyar Y. Barazesh, Maple Grove, MN (US); David A. Harper, St. Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 192 days.

(21) Appl. No.: 13/688,831

(22) Filed: Nov. 29, 2012

(65) Prior Publication Data

US 2014/0146289 A1    May 29, 2014

(51) Int. Cl.
*G03B 21/28* (2006.01)
(52) U.S. Cl.
CPC ..................................... *G03B 21/28* (2013.01)
USPC ................... 353/99; 353/22; 353/28; 353/30; 353/74; 353/119; 345/173; 359/838
(58) Field of Classification Search
USPC ........... 353/3, 22, 28, 30, 72, 74, 84, 99, 119; 359/872, 223.1, 298, 838; 345/7, 8, 345/173; 348/743–747
See application file for complete search history.

(56) References Cited

U.S. PATENT DOCUMENTS

| | | | |
|---|---|---|---|
| 4,799,133 A | 1/1989 | Strzalko | |
| 6,142,316 A | 11/2000 | Harbour | |
| 6,202,334 B1 | 3/2001 | Reynolds | |
| 6,607,275 B1 | 8/2003 | Cimini | |
| 6,964,481 B2 | 11/2005 | Pho | |
| 7,845,102 B2 | 12/2010 | Choi | |
| 7,923,675 B2 | 4/2011 | Tanis-Likkel | |
| 2003/0231261 A1 | 12/2003 | Bassi | |
| 2008/0204668 A1 | 8/2008 | Dammura | |
| 2009/0201589 A1* | 8/2009 | Freeman | 359/630 |
| 2010/0149073 A1* | 6/2010 | Chaum et al. | 345/8 |

(Continued)

FOREIGN PATENT DOCUMENTS

| | | |
|---|---|---|
| EP | 1779031 | 5/2007 |
| GB | 2065470 | 7/1981 |
| GB | 2470086 | 11/2010 |
| WO | WO 01-69349 | 9/2001 |

OTHER PUBLICATIONS

PCT International Search Report for PCT/US2013/070063, mailed Feb. 26, 2014.

*Primary Examiner* — Sultan Chowdhury

(57) ABSTRACT

A system for on-product projection and display of electronic content. The system includes a projector for projecting electronic content, a mirror film stack having a reflective surface facing the projector, and a product having an exterior surface facing the reflective surface of the mirror film stack. A graphic is located on a surface of the mirror film stack opposite the reflective surface. The electronic content from the projector is projected onto the exterior surface of the product via the reflective surface of the mirror film stack. The graphic can be located on a display window and hide the mirror from a viewer without completely blocking a view of the projected electronic content. The product can include a removable projection screen for displaying the electronic content, and the projection screen can include a removable label on its non-viewer side to advertise or promote the product.

17 Claims, 5 Drawing Sheets

(56) References Cited

U.S. PATENT DOCUMENTS

| | | |
|---|---|---|
| 2010/0181449 A1 | 7/2010 | Weigand |
| 2011/0181792 A1 | 7/2011 | Hammonds |
| 2011/0279666 A1 * | 11/2011 | Strombom et al. ............. 348/78 |
| 2012/0327297 A1 | 12/2012 | Roberts |
| 2013/0300637 A1 * | 11/2013 | Smits et al. ....................... 345/8 |

* cited by examiner

US 8,919,969 B2

ON-PRODUCT PROJECTION FOR DIGITAL MERCHANDIZING

BACKGROUND

Digital merchandizing includes displaying advertisements electronically to potential consumers. There are a variety of techniques to accomplish this task, from television commercials to retail demonstrations, the majority of which use an LCD or plasma device to display information. In retail environments, the displays can become a part of the background, often not being noticed by the consumers as a result. Accordingly, a need exists for new and different designs to attract consumers' attention and offer relevant information to them.

SUMMARY

A system for on-product projection of content, consistent with the present invention, includes a projector for projecting electronic content, a mirror film stack having a reflective surface facing the projector, and a product having an exterior surface facing the reflective surface of the mirror film stack. A graphic is located on a surface of the mirror film stack opposite the reflective surface. The electronic content from the projector is projected onto the exterior surface of the product via the reflective surface of the mirror film stack, and the graphic does not completely block a view of the electronic content projected onto the exterior surface of the product.

A product configured for on-product projection of content, consistent with the present invention, includes a projection screen on an exterior surface of a product and a label located between the projection screen and the product. The label is removably adhered to the projection screen and to an exterior surface of the product. The projection screen can display projected electronic content when the projection screen and label are removably adhered the exterior surface of the product.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Embodiments of the present invention include various projection systems to enable on-product projection of changeable electronic content. This projection can provide for dynamic labeling of products located on standard store shelves, in coolers, behind glass display windows, or elsewhere in retail environments. Examples include shelf-mounted projectors located either above or below products, along with a mirror to direct content from the projectors to the products. Other examples include projection onto a product having a transparent or semi-transparent removable projection screen for displaying content projected upon it and for providing viewing of printed content on the product underneath the projection screen.

Figure 1:
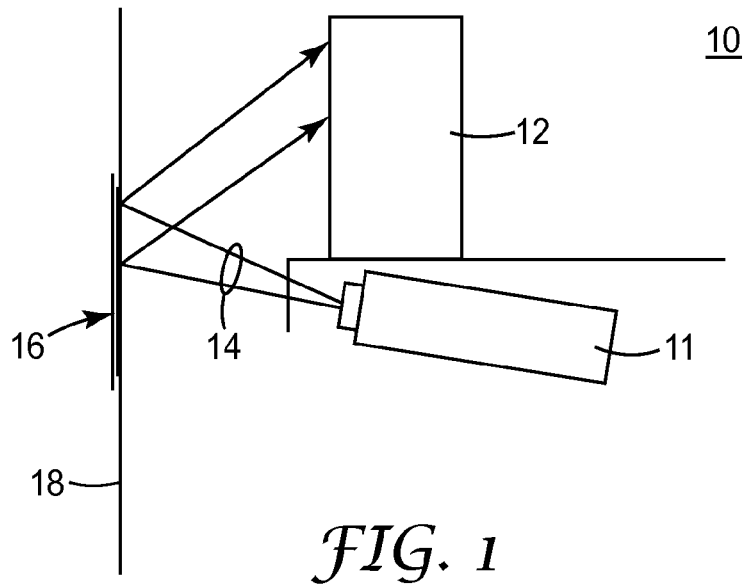
FIG. 1 is a side view of a system for on-product projection using a mirror film stack having a graphic.
Figure 2:
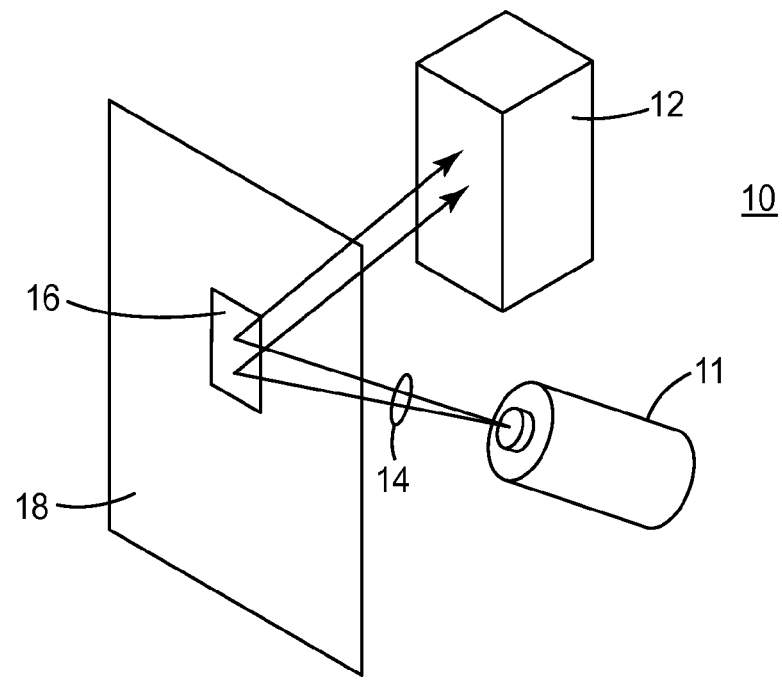
FIG. 2 is a perspective view of the system of FIG. 1.
Figure 3:
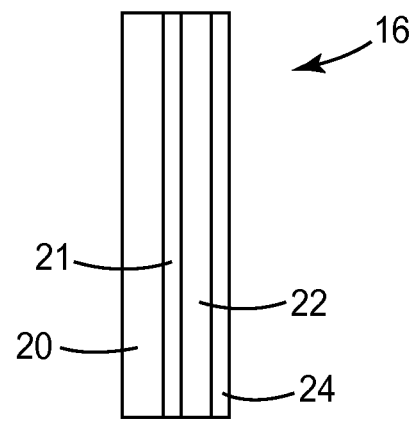
FIG. 3 is a side view of a mirror film stack having a graphic for on-product projection.
Figure 4:
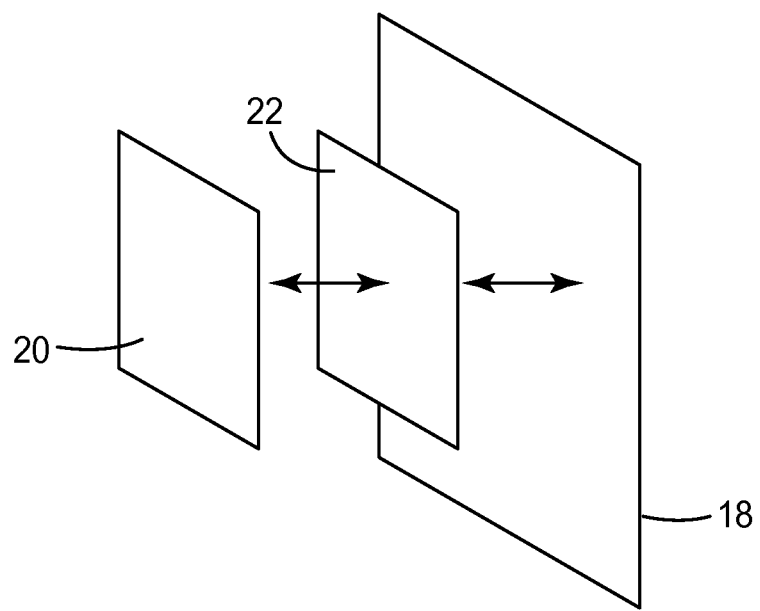
FIG. 4 is a perspective view of the mirror film stack of FIG. 3.

FIGS. 1 and 2 are side and perspective views, respectively, of a system 10 for on-product projection using a mirror film stack having a graphic. System 10 includes a projector 11, a mirror film stack 16 on a display window 18, and a product 12. As illustrated in FIGS. 3 and 4, mirror film stack 16 includes a mirror 22 with an optically clear easy release adhesive 24, and a graphic 20 with an easy release adhesive 21. Mirror film stack 16 is preferably located outside display window 18 on a side of window 18 opposite product 12. Also, mirror film stack 16 is located on window 18 in a location such that it does not completely block a view of product 12 through display window 18.

In use, projector 11 projects content to product 12 via mirror film stack 16, as represented by lines 14. Graphic 20 is located such that it does not completely block a view of the projected content on product 12 and preferably does not block any of the projected content from a viewer's position in front of display window 18. Graphic 20 effectively hides the mirror from a viewer located on a side of display window 18 opposite product 12. The use of optically clear easy release adhesive 24 provides a way to easily move mirror film stack 16 to different locations on display window 18 or other display windows. The use of easy release adhesive 21 provides a way to easily change a graphic on mirror film stack 16. Graphic 20 can include content relating to product 12, for example. The content projected onto product 12 from projector 11 can also be related to product 12, for example, and be used to advertise or promote product 12. In this example, the content is projected directly onto product 12 without use of a projection screen on product 12. For this projection directly onto the product, the exterior surface of the product where the projected content is displayed can optionally have a matte printed surface or a matte unprinted surface.

Figure 5:
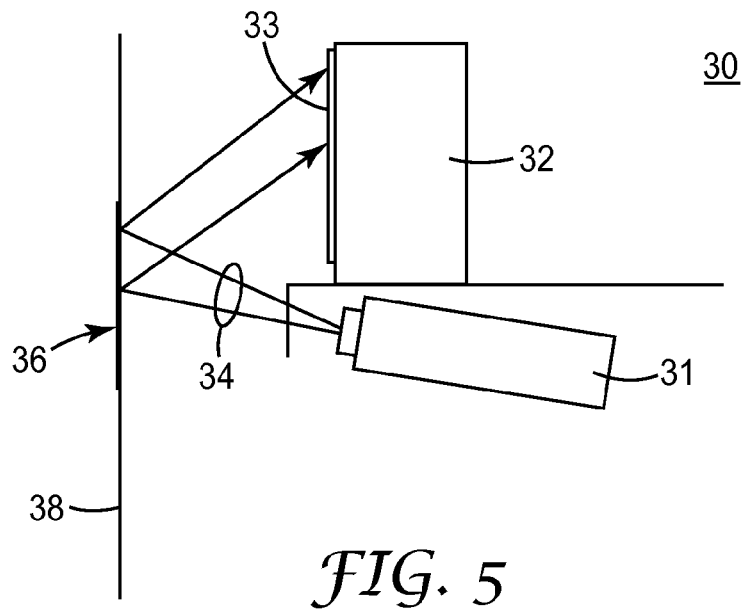
FIG. 5 is a side view of a system for on-product projection using a removable projection screen on a product.
Figure 6:
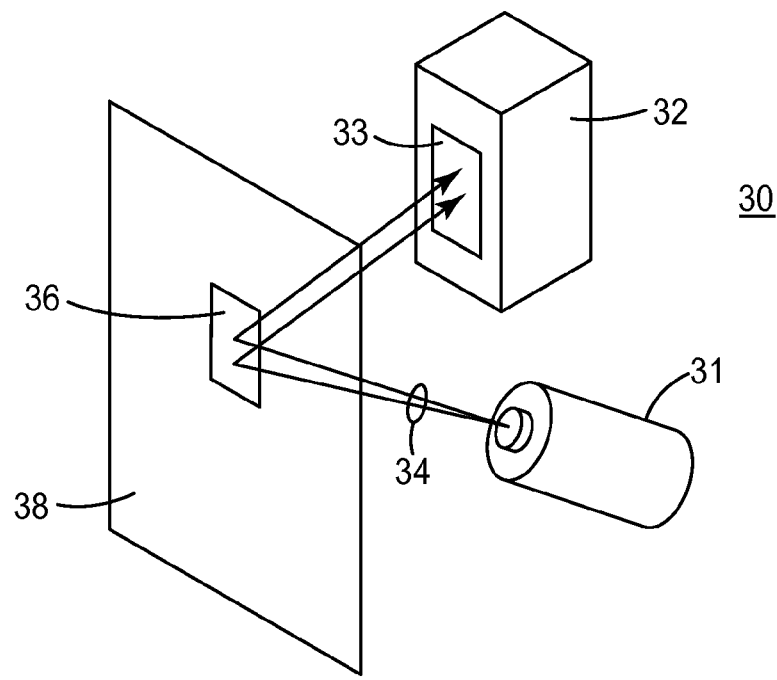
FIG. 6 is a perspective view of the system of FIG. 5.
Figure 7:
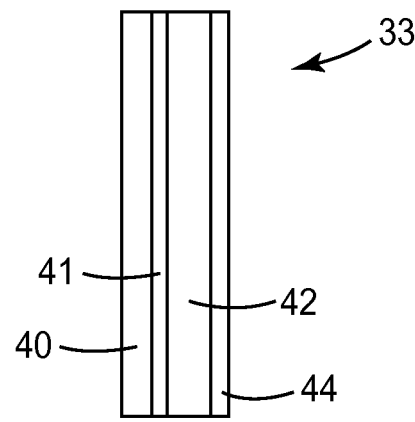
FIG. 7 is a side view of a removable projection screen for on-product projection.
Figure 8:
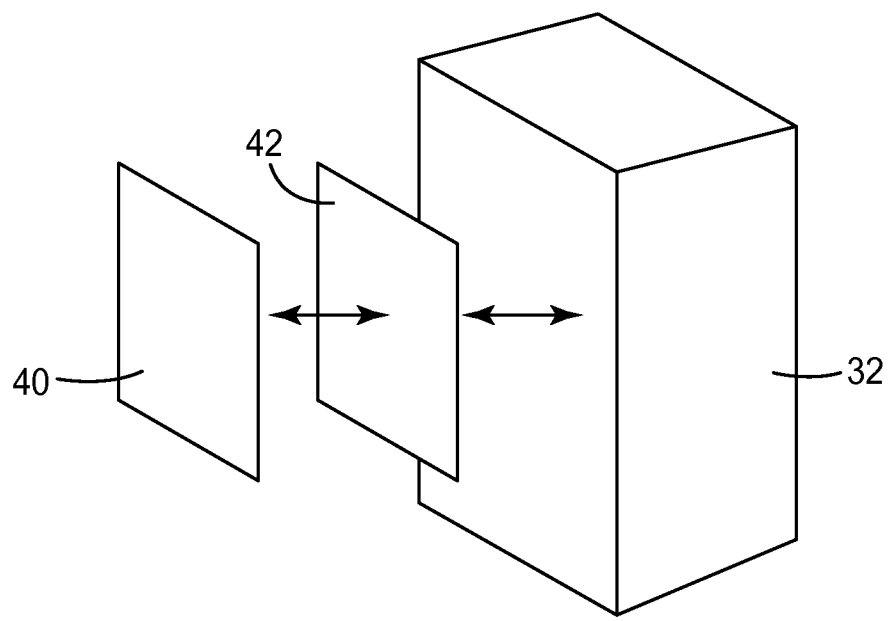
FIG. 8 is a perspective view of the projection screen of FIG. 7.

FIGS. 5 and 6 are side and perspective views, respectively, of a system 30 for on-product projection using removable projection screen on the product. System 30 includes a projector 31, a mirror film stack 36 on a display window 38, a product 32, and a removable projection screen 33 on product 32. Mirror film stack 36 can correspond with mirror film stack 16 or, alternatively, be implemented with a mirror without a graphic. As illustrated in FIGS. 7 and 8, removable projection screen 33 includes a projection screen 40 having an easy release adhesive 41 and an optional label 42 with an easy release adhesive 44.

In use, projector 31 projects content to removable projection screen 33 on product 32 via mirror film stack 36, as represented by lines 34. The use of easy release adhesive 41 provides a way to easily remove projection screen 33 from product 32 and possibly use it on another product. When optional label 42 is used, easy release adhesive 44 provides a way to easily remove projection screen 33 from product 32. The use of easy release adhesive also provides a way to easily remove label 42, when used, from projection screen 40. Label 42 can include printed content relating to product 32, for example, and possibly include content intended to promote product 32 such as a coupon or rebate for the product. The content projected onto product 32 from projector 31 can also be related to product 32, for example, and be used to advertise or promote product 32.

Figure 9:
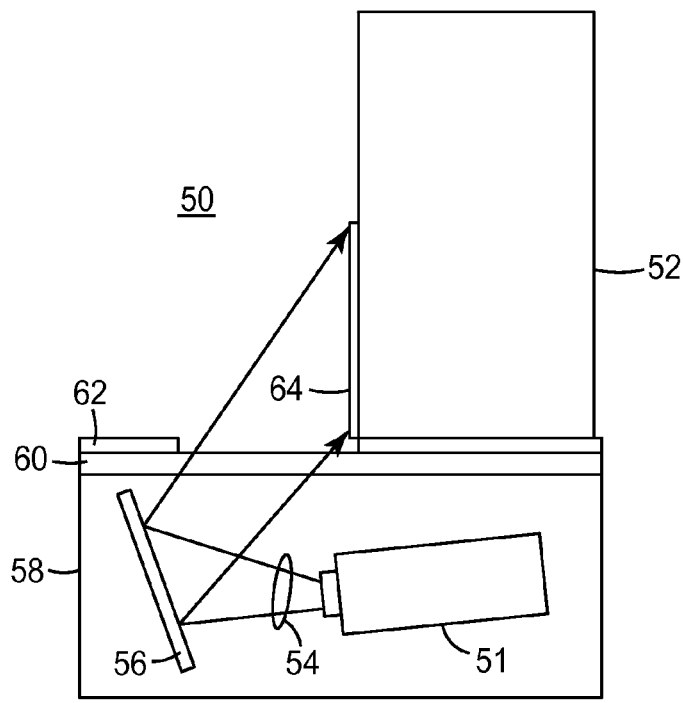
FIG. 9 is a side view of a system for on-product projection using a tilted mirror.

FIG. 9 is a side view of a system 50 for on-product projection using a tilted mirror. System 50 includes a projector 51, a mirror 56, and a product 52. Projector 51 and mirror 56 are contained within an optional enclosure 58 having a transparent top 60 and an opaque layer 62 to hide the projector and mirror from view. In this example, mirror 56 is tilted with respect to projector 51, meaning the reflective surface of the mirror is arranged non-parallel with an exterior surface of product 52 for displaying projected content. In use, projector 51 projects content to product 52 via mirror 56, as represented by lines 54. The content is projected onto a projection area 64 on an exterior surface of product 52. Projection area 64 can include a label or matte finish surface on the product. The label in projection area 64, when used, can include a removable projection screen such as the projection screen described above.

Figure 10:
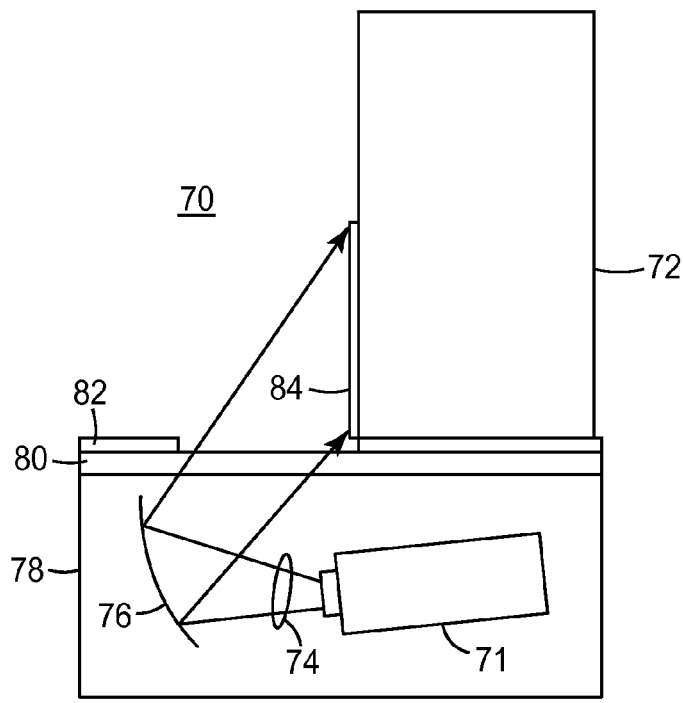
FIG. 10 is a side view of a system for on-product projection using a curved mirror.

FIG. 10 is a side view of a system 70 for on-product projection using a curved mirror. System 70 includes a projector 71, a mirror 76, and a product 72. Projector 71 and mirror 76 are contained within an optional enclosure 78 having a transparent top 80 and an opaque layer 82 to hide the projector and mirror from view. In this example, the reflective surface of mirror 76 is curved. In use, projector 71 projects content to product 72 via mirror 76, as represented by lines 74. The content is projected onto a projection area 84 on an exterior surface of product 72. Projection area 84 can include a label or matte finish surface on the product. The label in projection area 84, when used, can include a removable projection screen such as the projection screen described above.

The enclosures 58 and 78, along with the transparent tops (60, 80) and opaque layers (62, 82), are optional components in systems 50 and 70. Without the enclosures and related components, products 52 and 72 can be located on or under a shelf, for example, or otherwise mounted to display content projected upon them. Also without the enclosures, mirrors 56 and 76 can be implemented with a mirror film stack similar to mirror film stack 16 in FIG. 1. In particular, the back sides of mirrors 56 and 76 (opposite the reflective surface) can have a graphic to display information to a viewer of the product and possibly hide the mirrors. When a graphic is used on the back side of mirror 56, the graphic can be tilted with respect to the product or located elsewhere in the viewer's visual path to help hide the mirror. When a graphic is used on the back side of mirror 76, the graphic can be curved to conform to the shape of the mirror or located elsewhere in the viewer's visual path to help hide the mirror.

Systems for on-product projection can use the exemplary materials in the Examples and have the following configurations. The projected changeable electronic content can include video and digital (still) images. Although the projectors in FIGS. 1 and 5 are shown underneath the products, the projectors can be located above the products or in other locations for projecting content to the products via the mirrors by adjusting the mirror angle, the projector angle, or both of these angles. The exemplary display windows can be located on a product display case or cooler, for example. Alternatively, the mirrors can be mounted without use of a display window. The graphic on the back side of the mirror (opposite the reflective surface) facing the viewer can include any printed content and can effectively hide the mirror from the viewer such that the viewer sees the graphic instead of the back side of a mirror. The graphic or an enclosure can partially or completely cover the back surface of the mirror.

The graphic can include, for example, content relating to the product. The label on the removable projection screen can also include any printed content. The label can include, for example, content related to the product onto which the projection screen and label are affixed and can be used to advertise or promote the product. The graphic and label can also include, for example, a QR code that provides the viewer with a link to a web site providing information about the product.

The removable projection screen can be transparent such that printed content on the product, or on the optional label, is viewable when the projection screen is not displaying projected content, even though the appearance of the projection screen over the content may still be noticeable. The projection screen can also be semi-transparent (including translucent) such that content underneath the projection screen is obscured but partially viewable when the projection screen is not displaying projected content.

The term "product" is intended to include products and packaging to contain the products. Therefore, on-product projection includes projection onto a product and onto packaging for the product. The products in FIGS. 1 and 5 are shown as boxes with planar surfaces displaying the projected content for illustrative purposes only; on-product projection can be used on products having a variety of shapes and configurations. For example, on-product projection can be used to project content onto a curved surface of a product. Examples of projection onto curved surfaces are described in U.S. patent application Ser. No. 13/165,896, entitled "Display System and Method for Projection Onto Non-Planar Surfaces," and filed Jun. 22, 2011, which is incorporated herein by reference as if fully set forth.

The projection screens, where used, can be rectangular, circular, or shaped to some other complex defined shape, such as, for example, a coffee cup, six-pack of cans, a logo, or any other desired shape, subject to the capabilities of the projector. Additionally the projection screens can be contiguous or discontiguous, and can have holes or other cutouts in them. A system for projection of content onto a cut-out or a screen defining a shape is described in U.S. Pat. No. 7,923,675, which is incorporated herein by reference as if fully set forth. In addition to the projection screens identified in the Examples, the projection screens can be implemented with a diffuse surface on a mirror or diffuse surface on a reflective polarizer.

Additionally, the projection screen, where used, can optionally be supplemented with a reflective element such as a reflective polarizer aligned to optimally reflect the projected image or other mirror element. In these cases, the reflective element is preferred to be located behind the projection screen and in front of the optional printed label.

The mirrors or mirror film stacks, where used on glass, can be attached using either permanent or removable (repositionable) adhesives, depending upon need for example.

EXAMPLES

| Materials and Components for the Examples | | |
|---|---|---|
| Abbreviation or Product Name | Description | Available from |
| DBEF-Q | Reflective polarizer film that reflects light polarized along a reflection axis and transmits light polarized along a pass axis | 3M Company, St. Paul, MN |

-continued

Materials and Components for the Examples

| Abbreviation or Product Name | Description | Available from |
|---|---|---|
| ESR | Reflective Multilayer Optical Film that reflects light like a mirror. | 3M Company, St. Paul, MN |
| 3M 8172 OCA | Optically clear adhesive, 51 micron (2 mil) film | 3M Company, St. Paul, MN |
| 3M CONTROLTAC Removable OCA | Optically clear removable adhesive | 3M Company, St. Paul, MN |
| MPro 180 | Projector that outputs primarily linearly polarized light | 3M Company, St. Paul, MN |
| MPro 410 | Projector that outputs primarily unpolarized light | 3M Company, St. Paul, MN |
| 3M 3635-30 Adhesive Film | Diffuse translucent white adhesive film | 3M Company, St. Paul, MN |
| 3M D3-340 Reflective Polarizer | Diffuse coated reflective polarizer film | 3M Company, St. Paul, MN |
| POST-IT Brand Super Sticky Label Pads | Repositionable adhesive-backed label | 3M Company, St. Paul, MN |

Example 1

A mirror film stack was constructed as follows. An approximately 12 cm×7.5 cm sheet of ESR was cut out with scissors and attached to the outside surface of a clear acrylic panel using 3M 8172 OCA. A printed POST-IT label was removably attached to the surface of the ESR.

An MPro 180 projector was mounted at a tilt angle under a product box as shown in FIGS. 5 and 6 with the mirror film stack positioned to reflect the projected image onto the product box.

3M 3635-30 adhesive film was attached to the product box for use as a projection screen. The product box in this example was the box in which the MPro 180 projector was originally packaged. The projector was set at an angle by hand until the projected image was aligned with the screen on the product box. With the projector turned on, the projected image was clearly visible on the product box. With the projector turned off, the graphics on the product box were visible through the 3M 3635-30 adhesive film.

Example 2

An MPro 180 projector was mounted horizontally under a shelf with a mirror film stack prepared as in Example 1 mounted underneath the shelf, with the exception that DBEF-Q oriented in its reflective state relative to the projector was substituted for the ESR. A product box was positioned on the shelf, and the mirror film stack was positioned by hand at an angle so that it would reflect the projected image onto the product box. The product box in this example was the original box in which the MPro 180 projector was packaged. An approximately 12 cm×7.5 cm piece of 3M D3-340 reflective polarizer film was cut out with scissors and was removably attached to the product box for use as a projection screen using 3M CONTROLTAC Removable OCA. The 3M D3-340 reflective polarizer film was oriented so that the polarization direction of the imaged light produced by the projector was aligned with the reflection axis of the 3M D3-340 reflective polarizer film. The angle of the mirror was adjusted by hand until the projected image was aligned with the screen on the product box. With the projector turned on, the projected image was clearly visible on the product box. With the projector turned off, the graphics on the product box were visible through the 3M D3-340 reflective polarizer film.

Example 3

An optical system was placed in a 31 cm×45 cm×5 cm metal frame. The optical system consisted of a 3M MPro 410 and a 13 cm×10 cm first surface planar mirror. The first surface mirror was mounted by means of a locking hinge and was set at an angle of 68 degrees where 0 degrees corresponds to the horizontal axis pointing away from the projector towards the front of the system. The projector was mounted on a piece of aluminum bent to an angle of −10 degrees relative to the same horizontal axis as was used for mirror. The projector was mounted on the aluminum so the top edge of the front of the projector was 6 cm above the bottom of the support plate. The projector was mounted at a distance of approximately 9 cm measured from the bottom edge of the mirror to the front bottom edge of the projector. A projected image reflected off the mirror upwards and backwards toward the product box as shown in FIG. 9. A product box was placed on a conventional opaque black PVC sheet on top of a piece of optically transparent acrylic; the periphery of both measured 62 cm wide×36 cm deep. An area measuring 14 cm wide×8 cm deep was cut out 4 cm from the front edge of the black sheet so as to enable the projected image to pass freely to the product. The product box in this example was a cardboard box that had contained 24 12 oz soda cans. The surface of the product box was not planar, but bulged outward near the center of the box. The product box was aligned to the desired position and a shaped piece of 3M 3635-30 adhesive film was attached to the product box for use as a shaped projection screen. The shaped screen was in the shape of an overlapping 2×2 array of soda cans viewed in perspective and had overall dimensions of about 8.7 cm×8.3 cm. The projected image was corrected for distortion by digitizing the shaped display surface associated with the shape of the screen on the product box and digitally converting the projected content to remove distortion as described in U.S. patent application Ser. No. 13/165,896.

Example 4

A system similar to Example 3 was made by substituting a suitably curved mirror in place of the planar first surface mirror. This is illustrated in FIG. 10. The mirror curvature was optimized to reduce the image distortion in a manner similar to that described in U.S. Patent Application Publication No. 2003/0231261, thereby enabling less pre-processing of the projected image.

The invention claimed is:

1. A system for on-product projection of content, comprising:
   a projector for projecting electronic content;
   a mirror film stack having a reflective surface facing the projector and a graphic on a surface opposite the reflective surface; and
   a product having an exterior surface facing the reflective surface of the mirror film stack,
   wherein the electronic content from the projector is projected onto the exterior surface of the product via the reflective surface of the mirror film stack, and the graphic does not completely block a view of the electronic content projected onto the exterior surface of the product.

2. The system for on-product projection of content of claim 1, wherein the graphic completely covers the surface of the mirror film stack opposite the reflective surface.

3. The system for on-product projection of content of claim 1, wherein the graphic is removably adhered to the mirror film stack.

4. The system for on-product projection of content of claim 1, further comprising a display window having a first surface facing the product and a second surface opposite the first surface, wherein mirror film stack is located on the second surface of the display window.

5. The system for on-product projection of content of claim 4, wherein the mirror film stack is removably adhered to the second surface.

6. The system for on-product projection of content of claim 1, wherein the projector is located at least partially underneath the product.

7. The system for on-product projection of content of claim 1, wherein the electronic content is projected directly onto the exterior surface of the product.

8. The system for on-product projection of content of claim 1, wherein the electronic content is projected onto a shaped projection area on the exterior surface of the product.

9. The system for on-product projection of content of claim 1, further comprising a projection screen located on the exterior surface of the product, wherein the electronic content is projected onto the projection screen.

10. The system for on-product projection of content of claim 9, wherein the projection screen is transparent.

11. The system for on-product projection of content of claim 9, wherein the projection screen is semi-transparent.

12. The system for on-product projection of content of claim 9, wherein the projection screen is removably adhered to the exterior surface of the product.

13. The system for on-product projection of content of claim 7, wherein the exterior surface of the product has a matte finish.

14. The system for on-product projection of content of claim 1, wherein the exterior surface of the product is planar.

15. The system for on-product projection of content of claim 1, wherein the exterior surface of the product is non-planar.

16. The system for on-product projection of content of claim 1, wherein the reflective surface of the mirror film stack is tilted with respect to the product.

17. The system for on-product projection of content of claim 1, wherein the reflective surface of the mirror film stack is curved.

* * * * *

UNITED STATES PATENT AND TRADEMARK OFFICE
CERTIFICATE OF CORRECTION

PATENT NO.        : 8,919,969 B2                              Page 1 of 1
APPLICATION NO.   : 13/688831
DATED             : December 30, 2014
INVENTOR(S)       : Biernath et al.

It is certified that error appears in the above-identified patent and that said Letters Patent is hereby corrected as shown below:

In the Claims

Col. 7, line 28, In Claim 4, after "wherein" insert -- the --.

Col. 7, lines 30-31, In Claim 5, delete "claim 4," and insert -- claim 1, --.

Signed and Sealed this
Twenty-second Day of December, 2015

Michelle K. Lee
*Director of the United States Patent and Trademark Office*